US011947435B2

United States Patent
Boulineau et al.

(10) Patent No.: US 11,947,435 B2
(45) Date of Patent: Apr. 2, 2024

(54) METHOD AND DEVICE FOR TESTING MICROSERVICE-BASED COMPUTING PLATFORMS

(71) Applicant: Amadeus S.A.S., Biot (FR)

(72) Inventors: Vincent Boulineau, Antibes (FR); Nicolas Isch, Villeneuve-Loubet (FR); Serge Beuzit, Mouans Sartoux (FR)

(73) Assignee: Amadeus S.A.S., Biot (FR)

( * ) Notice: Subject to any disclaimer, the term of this patent is extended or adjusted under 35 U.S.C. 154(b) by 69 days.

(21) Appl. No.: 17/876,946

(22) Filed: Jul. 29, 2022

(65) Prior Publication Data

US 2023/0054780 A1    Feb. 23, 2023

(30) Foreign Application Priority Data

Aug. 16, 2021   (EP) ..................................... 21306121

(51) Int. Cl.
*G06F 11/263*   (2006.01)
*G06F 9/54*      (2006.01)

(52) U.S. Cl.
CPC ............ *G06F 11/263* (2013.01); *G06F 9/546* (2013.01)

(58) Field of Classification Search
CPC ............................... G06F 11/263; G06F 9/546
USPC .......................................................... 714/33
See application file for complete search history.

(56) References Cited

U.S. PATENT DOCUMENTS

| | | | |
|---|---|---|---|
| 9,842,045 B2 * | 12/2017 | Heorhiadi | G06F 11/3692 |
| 2021/0125007 A1 * | 4/2021 | Jayanthi | G06F 11/3006 |
| 2022/0035689 A1 * | 2/2022 | Raheja | G06F 9/5011 |
| 2022/0066916 A1 * | 3/2022 | McQuee | G06F 9/451 |

(Continued)

FOREIGN PATENT DOCUMENTS

WO    WO-2018145559 A1 *   8/2018   ............... G06F 9/38

OTHER PUBLICATIONS

Wang et al., "Workflow-Aware Automatic Fault Diagnosis for Microservice-Based Applications With Statistics," in IEEE Transactions on Network and Service Management, vol. 17, No. 4, pp. 2350-2363, Dec. 2020, doi: 10.1109/TNSM.2020.3022028. (Year: 2020).*

(Continued)

*Primary Examiner* — Chae M Ko
(74) *Attorney, Agent, or Firm* — Thompson Hine LLP

(57) ABSTRACT

A computer-implemented method for testing a functionality of a computing platform, the computing platform comprising a first microservice, the method comprising: receiving, by an injector microservice, a test configuration file; determining from the test configuration file: a test input message; a test input communication mechanism; and a test output communication mechanism. The method further comprises: generating a test identifier for identifying that a message is being used for testing purposes; transmitting, by the injector microservice, the test input message to the first microservice using the test input communication mechanism, wherein the test input message comprises the test identifier; identifying, by the injector microservice, an output message transmitted via the test output communication mechanism that comprises the test identifier; and recording, by the injector microservice, the output message comprising the test identifier.

17 Claims, 8 Drawing Sheets

(56) References Cited

U.S. PATENT DOCUMENTS

2022/0191234 A1* 6/2022 Fox ..................... G06N 20/00
2022/0269582 A1* 8/2022 Spiro ................. G06F 11/3664

OTHER PUBLICATIONS

Li Hongwei et al., "Research on Microservice Application Testing System," 2020 IEEE 3rd International Conference on Information Systems and Computer Aided Education (ICISCAE), IEEE Sep. 27, 2020 (Sep. 27, 2020), pp. 363-368, XP033847941, DOI: 10.1109/ICISCAE51034.2020.9236829.
European Patent Office, Extended European Search Report issued in European Patent Application No. 21306121.1 X dated Feb. 8, 2022, 11 pages.

* cited by examiner

METHOD AND DEVICE FOR TESTING MICROSERVICE-BASED COMPUTING PLATFORMS

FIELD

Embodiments described herein relate generally to a computer-implemented method and an apparatus for testing a functionality of a computing platform, the computing platform comprising a microservice.

BACKGROUND

Present-day software applications are increasingly complex and routinely contain an array of functionality. Software applications have previously been designed using a monolith application architecture i.e. as a single logical executable containing most of the application's functionality. As the complexity of an application increases, development as a monolith application becomes increasingly unattractive since the whole application generally needs to be redeployed in the event of a minor change.

One way to address this problem is to use microservices. In contrast to a monolith application architecture, a microservice-based application architecture comprises a plurality of independent modules, each implementing different standalone tasks and each communicating with each other by defined interfaces. Using microservices in this way allows new functionality to be added and existing functionality to be modified without wholescale redeployment of the application. This is particularly advantageous in Agile development environments where an application's functionality is continuously updated, tested and deployed.

While microservice-based architectures can be easier to modify, they can also be harder to test in a representative way, in part due to the complexity of simulating interactions between the various microservices. Performing end-to-end tests requires the injection of test messages and test data feeds however, this is generally challenging as it requires managing a number of dependencies. Furthermore, it is generally desirable to test the application in an environment where it will be put to use by the end user (i.e. in a production environment) however this is not currently possible. As a result, there is a need for a new way of testing microservice-based applications.

SUMMARY

According to a first aspect there is provided a computer-implemented method for testing a functionality of a computing platform, the computing platform comprising a first microservice. The method comprising: receiving, by an injector microservice, a test configuration file; determining from the test configuration file: a test input message; a test input communication mechanism; and a test output communication mechanism. The method further comprising: generating a test identifier for identifying that a message is being used for testing purposes; transmitting, by the injector microservice, the test input message to the first microservice using the test input communication mechanism, wherein the test input message comprises the test identifier; identifying, by the injector microservice, an output message transmitted via the test output communication mechanism that comprises the test identifier; and recording, by the injector microservice, the output message comprising the test identifier.

In an embodiment recording the output message further comprises recording the contents of the output message and/or properties of the output message.

In an embodiment properties of the output message comprise a time of transmission of the output message.

In an embodiment the method further comprises recording the output message in a log file and transmitting the log file to a user.

In an embodiment an indication that the test input message is for testing purposes is an indication that the test input message is not real traffic.

In an embodiment a content field of the test configuration file comprises the test input message.

In an embodiment the test input communication mechanism is one of a Kafka topic or HTTP.

In an embodiment the test output communication mechanism is one of a Kafka topic or HTTP.

In an embodiment the test identifier is a correlation id.

In an embodiment the test input communication mechanism is a first data stream; and wherein transmitting, by the injector microservice, the test input message comprises: generating a first data record comprising the test input message; and publishing the first data record to the first data stream.

In an embodiment the computing platform uses a streaming architecture.

In an embodiment the first data stream is a Kafka topic.

In an embodiment the first data record is a Kafka record.

In an embodiment the computing platform uses Kafka streams.

In an embodiment the test configuration file comprises an input format field and a content field and wherein generating the first data record comprises converting the content field based on a contents of the input format field.

In an embodiment the test output communication mechanism is a second data stream; the test identifier comprises a correlation identification value; and identifying, by the injector microservice, the output message transmitted via the test output communication mechanism comprises: subscribing to the second data stream; and identifying a second data record published to the second data stream comprising the correlation identification value.

In an embodiment the correlation identification value is an alpha-numeric value.

In an embodiment the second data stream is a Kafka topic.

In an embodiment the data record comprises a key, a timestamp and a value and wherein the key of the data record comprises the correlation id.

In an embodiment the method further comprises transmitting an output message comprising the correlation id.

In an embodiment the output message further comprises filtered records comprising the correlation id.

In an embodiment the test configuration file further comprises a first limit associated with a predetermined threshold and identifying the output message transmitted via the test output communication mechanism comprises identifying a number of output messages transmitted via the test output communication mechanism, the number of output messages being greater than or equal to one; and wherein the method further comprises: determining, by the injector microservice, whether the number of output messages equals the predetermined threshold; and in response to determining that the number of output messages equals the predetermined threshold: transmitting, by the injector microservice, information recorded by the injector microservice.

In an embodiment recording the output message further comprises recording, by the injector microservice, the number of output messages transmitted via the test communication mechanism comprising the test identifier.

In an embodiment the number of output messages is greater than or equal to one.

In an embodiment the test configuration file comprises an output format field and the method further comprises converting the filtered records to a formal specified by the output format field.

In an embodiment the computing platform comprises a second microservice and wherein the method further comprises: obtaining, by the second microservice, a first message to be transmitted via the test output communication mechanism, wherein the first message is intended for a first destination; determining, by the second microservice, whether the first message comprises the test identifier; and in response to determining that the first message comprises the test identifier: transmitting, by the second microservice, the first message to the injector microservice.

In an embodiment the second microservice comprises a HTTP client and the test output communication mechanism is HTTP.

In an embodiment the first microservice and the second microservice are the same microservice.

In an embodiment the first message is the output message and wherein identifying the output message transmitted via the test output communication mechanism comprises: receiving, by the injector microservice, the first message intended for the first destination; and the method further comprises: determining, by the injector microservice, whether the test configuration file comprises a mock reply associated with the first destination; and in response to determining that the injector microservice does not comprise the mock reply associated with the first destination: transmitting, by the injector microservice, the first message intended for the first destination, to the first destination.

In an embodiment the method further comprises: transmitting the mock reply to the second microservice in response to determining that the test configuration file comprises the mock reply associated with the first destination.

In an embodiment the method further comprises recording, by the injector microservice, a transmission of the mock reply.

In an embodiment the method further comprises recording, by the injector microservice, properties of the mock reply.

In an embodiment properties of the mock reply comprise: the contents of the mock reply and/or the time of transmission of the mock reply.

In an embodiment the method further comprises receiving, by the injector microservice, a response message, wherein the response message is transmitted by the first destination in response to receiving the first message intended for the first destination; and transmitting, by the injector microservice to the second microservice, the response message, in response to receiving the response message transmitted by the first destination.

In an embodiment the method further comprises recording, by the injector microservice, information associated with the response message.

In an embodiment information associated with the response message comprises one of: a content of the response, a time of transmission of the response message by the injector microservice, a time of receipt of the response message by the injector microservice.

In an embodiment the method further comprises recording, by the injector microservice, information associated with the response message.

In an embodiment the test output communication mechanism is HTTP, the first message to be transmitted by the first communication mechanism is a HTTP message and the test identifier is a flag in a header of a HTTP message. HTTP is Hyper Text Transfer Protocol.

In an embodiment the test configuration file further comprises information identifying a criteria for recording messages, the computing platform comprises a second microservice; and the method further comprises: obtaining, by the second microservice, a first message that is to be transmitted by the second microservice, wherein the first message is intended for a first destination; determining whether the first message is being used for testing purposes; in response to determining that the first message is being used for testing purposes: transmitting, by the second microservice to the injector microservice, a request for the information identifying the criteria for recording messages; transmitting, by the injector microservice, to the second microservice, a second message comprising the information identifying the criteria for recording messages; receiving, by the second microservice, the second message; determining, by the second microservice, whether the first message satisfies the criteria for recording messages; and in response to determining that the first message satisfies the criteria: recording, by the second microservice, information associated with the first message.

In an embodiment determining whether the first message to be transmitted satisfies a criteria comprises: determining whether the origin of the first message and/or the description of the first message matches a predetermined criteria.

In an embodiment determining whether the first message to be transmitted satisfies a criteria comprises: determining whether at least one of: the original of the first message, the description of the first message, and/or the payload of the first message matches a predetermined criteria.

In an embodiment recording information comprises logging the first message, and properties of the first message including a time of transmission in a first log.

In an embodiment the method further comprises, transmitting, by the second microservice to the injector microservice, information associated with the first message.

According to a second aspect there is provided an apparatus for testing a functionality of a computing platform, wherein: the computing platform comprises a first microservice; and the apparatus comprises an injector microservice. The injector microservice configured to: receive a test configuration file; determine from the test configuration file: a test input message; a test input communication mechanism; and a test output communication mechanism. The injector microservice further configured to: generate a test identifier for identifying that a message is being used for testing purposes; transmit the test input message to the first microservice using the test input communication mechanism, wherein the test input message comprises the test identifier; identify an output message transmitted via the test output communication mechanism that comprises the test identifier; and record the output message comprising the test identifier.

In an embodiment the test input communication mechanism is a first data stream; and wherein the injector microservice is further configured to: generate a first data record comprising the test input message; and publish the first data record to the first data stream, when transmitting the test input message.

In an embodiment the test output communication mechanism is a second data stream; the test identifier comprises a correlation identification value; and the injector microservice is further configured to: subscribe to the second data stream; and identify a second data record published to the second data stream comprising the correlation identification value, when identifying the output message transmitted via the test output communication mechanism.

In an embodiment the test configuration file further comprises a predetermined threshold; and the injector microservice is further configured to: identify a number of output messages transmitted via the test output communication mechanism, the number of output messages being greater than or equal to one; and determine whether the number of output messages equals the predetermined threshold; and in response to determining that the number of output messages equals the predetermined threshold: transmit information recorded by the injector microservice.

In an embodiment the injector microservice is further configured to: receive a first message from a second microservice, the first message being intended for a first destination; determine whether the test configuration file comprises a mock reply associated with the first destination; and in response to determining that the injector microservice does not comprise the mock reply associated with the first destination: transmit the first message intended for the first destination, to the first destination.

In an embodiment the injector microservice is further configured to: transmit the mock reply to the second microservice in response to determining that the test configuration file comprises the mock reply associated with the first destination.

In an embodiment the injector microservice is further configured to: receive a response message, wherein the response message is transmitted by the first destination in response to receiving the first message intended for the first destination; and transmit, to the second microservice, the response message, in response to receiving the response message transmitted by the first destination.

In an embodiment the test output communication mechanism is HTTP, the first message to be transmitted by the first communication mechanism is a HTTP message and the test identifier is a flag in a header of a HTTP message.

In an embodiment the injector microservice is further configured to: receive a first message from a second microservice, wherein the first message is intended to be transmitted via the test output communication mechanism; determine whether the first message that is to be transmitted via the test output communication mechanism satisfies a criteria; and in response to determining that the first message satisfies the criteria: transmit, to the second microservice, an indication to record the first message.

According to a third aspect there is provided a computing system comprising a first microservice and an injector microservice, wherein the injector microservice is configured to: receive a test configuration file; determine from the test configuration file: a test input message; a test input communication mechanism; and a test output communication mechanism; generate a test identifier for identifying that a message is being used for testing purposes; transmit the test input message to the first microservice using the test input communication mechanism, wherein the test input message comprises the test identifier; identify an output message transmitted via the test output communication mechanism that comprises the test identifier; and record the output message comprising the test identifier.

In an embodiment the test input communication mechanism is a first data stream; and wherein the injector microservice is configured to: generate a first data record comprising the test input message; and publish the first data record to the first data stream, when transmitting the test input message.

In an embodiment the test output communication mechanism is a second data stream; the test identifier comprises a correlation identification value; and the injector microservice is configured to: subscribe to the second data stream; and identify a second data record published to the second data stream comprising the correlation identification value, when identifying the output message transmitted via the test output communication mechanism.

In an embodiment the test configuration file further comprises a first limit associated with a predetermined threshold and wherein the injector microservice is configured to: identify a number of output messages transmitted via the test output communication mechanism, the number of output messages being greater than or equal to one; and determine whether the number of output messages equals the predetermined threshold; and in response to determining that the number of output messages equals the predetermined threshold: transmit information recorded by the injector microservice.

In an embodiment the computing system further comprises a second microservice and wherein the second microservice is configured to: obtain a first message to be transmitted via the test output communication mechanism, wherein the first message is intended for a first destination; determine whether the first message comprises the test identifier; and in response to determining that the first message comprises the test identifier: transmit the first message to the injector microservice.

In an embodiment the first message is the output message and the injector microservice is further configured to: receive the first message intended for the first destination; determine whether the test configuration file comprises a mock reply associated with the first destination; and in response to determining that the injector microservice does not comprise the mock reply associated with the first destination: and transmit the first message intended for the first destination, to the first destination.

In an embodiment the injector microservice is further configured to: transmit the mock reply to the second microservice in response to determining that the test configuration file comprises the mock reply associated with the first destination.

In an embodiment the injector microservice is further configured to: receive a response message, wherein the response message is transmitted by the first destination in response to receiving the first message intended for the first destination; and transmit, to the second microservice, the response message, in response to receiving the response message transmitted by the first destination.

In an embodiment the test output communication mechanism is HTTP, the first message to be transmitted by the first communication mechanism is a HTTP message and the test identifier is a flag in a header of a HTTP message.

In an embodiment the test configuration file further comprises information identifying a criteria for recording messages, the computing platform comprises a second microservice; wherein the second microservice is configured to: obtain a first message that is to be transmitted by the second microservice, wherein the first message is intended for a first destination; determine whether the first message is being used for testing purposes; in response to determining that the first message is being used for testing purposes: transmit, to the injector microservice, a request for the information identifying the criteria for recording messages; receive, from the injector microservice, a second message comprising the information identifying the criteria for recording messages; determining, by the second microservice, whether the first message satisfies the criteria for recording messages; and in response to determining that the first message satisfies the criteria: record information associated with the first message, wherein the injector microservice is further configured to transmit the second message.

According to a fourth aspect there is provided a computer program comprising instructions which, when the program is executed by a computer, cause the computer to carry out the method of claim 1.

According to a fifth aspect there is provided a computer-readable storage medium comprising instructions which, when executed by a computer, cause the computer to carry out the steps of the method of claim 1.

According to a sixth aspect there is provided a computer-readable storage medium comprising instructions which, when executed by a computer, cause the computer to: receive a test configuration file; determine from the test configuration file: a test input message; a test input communication mechanism; and a test output communication mechanism; generate a test identifier for identifying that a message is being used for testing purposes; transmit the test input message to the first microservice using the test input communication mechanism, wherein the test input message comprises the test identifier; identify an output message transmitted via the test output communication mechanism that comprises the test identifier; and record the output message comprising the test identifier.

BRIEF DESCRIPTION OF THE DRAWINGS

Arrangements of the present invention will be understood and appreciated more fully from the following detailed description, made by way of example only and taken in conjunction with drawings in which.

DETAILED DESCRIPTION

Figure 1:
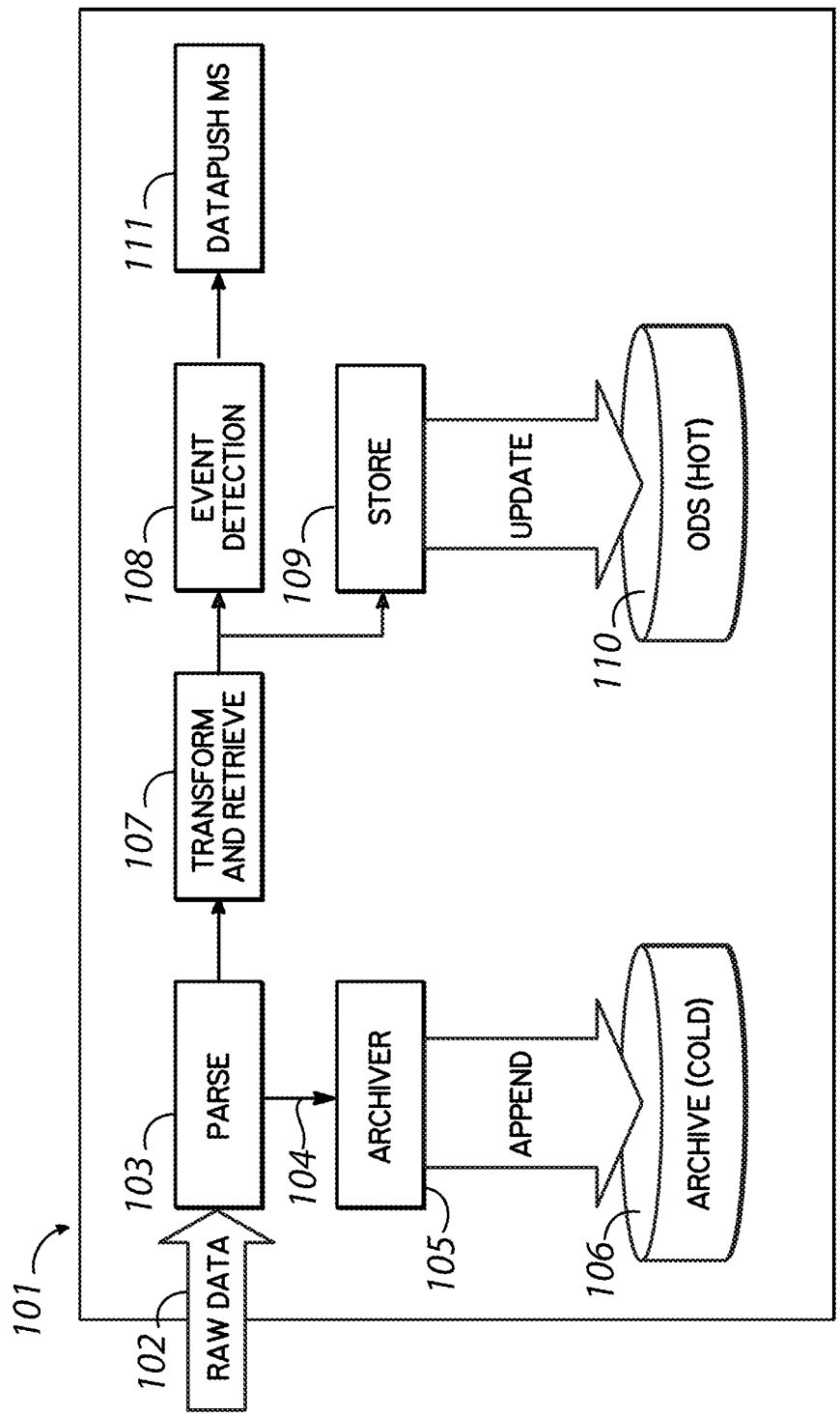
FIG. 1 shows a microservice-based platform architecture according to an embodiment.

FIG. 1 shows a microservice-based platform architecture according to an embodiment. FIG. 1 shows a platform 101 communicatively coupled to an input data feed 102. The platform 101 further comprises a plurality of components implemented using microservices. The plurality of components include a parser microservice 103 configured to parse raw data from the input data feed 102 into a format suitable for processing, an archiver microservice 105 configured to store the raw data in an archive 106. Optionally, the archive 106 is a cold data store (i.e. an archive that is used to store inactive data that is rarely used or accessed by the platform 101).

Platform 101 further comprises a transform and retrieve microservice 107 configured to enrich the data produced by the parser microservice 103. Optionally, the transform and retrieve microservice 107 is also configured to retrieve previously received and stored versions of the same message either from its local cache or from an operational data store 110. The platform 101 further comprises an event detection microservice 108 configured to generate events based on a comparison of a previous version and a current version of a given message. For example, if a terminal gate field of a Passenger Name Record (PNR) message changes from one version of the Passenger Name Record (PNR) message to another version, then an event (e.g. "field terminal gate updated") will be generated. The platform 101 further comprises a datapush microservice 111 configured to convert each message from an internal platform representation (e.g. Protocol Buffers) to an external representation (e.g. JavaScript Object Notation (JSON)). The datapush microservice 111 is further configured push the converted message to downstream systems.

In the embodiment of FIG. 1, the platform 101 also comprises a store microservice 109. The store microservice 109 is configured to store data outputted by the transform and retrieve microservice 107 in the operational data store (ODS) 110. Optionally, the operational data store 110 is a hot data store (i.e. a data store that is configured to support faster and more frequent access than a cold data store).

In FIG. 1 each of the microservices are communicatively coupled to each other as indicated by a communication link 104. As will be discussed in more detail below, connections between microservices can take many forms including, but not limited to, Kafka® streams and connections suitable for communicating HTTP requests. In general, communication link 104 takes any form that permits data to be communicated between microservices.

Figure 2:
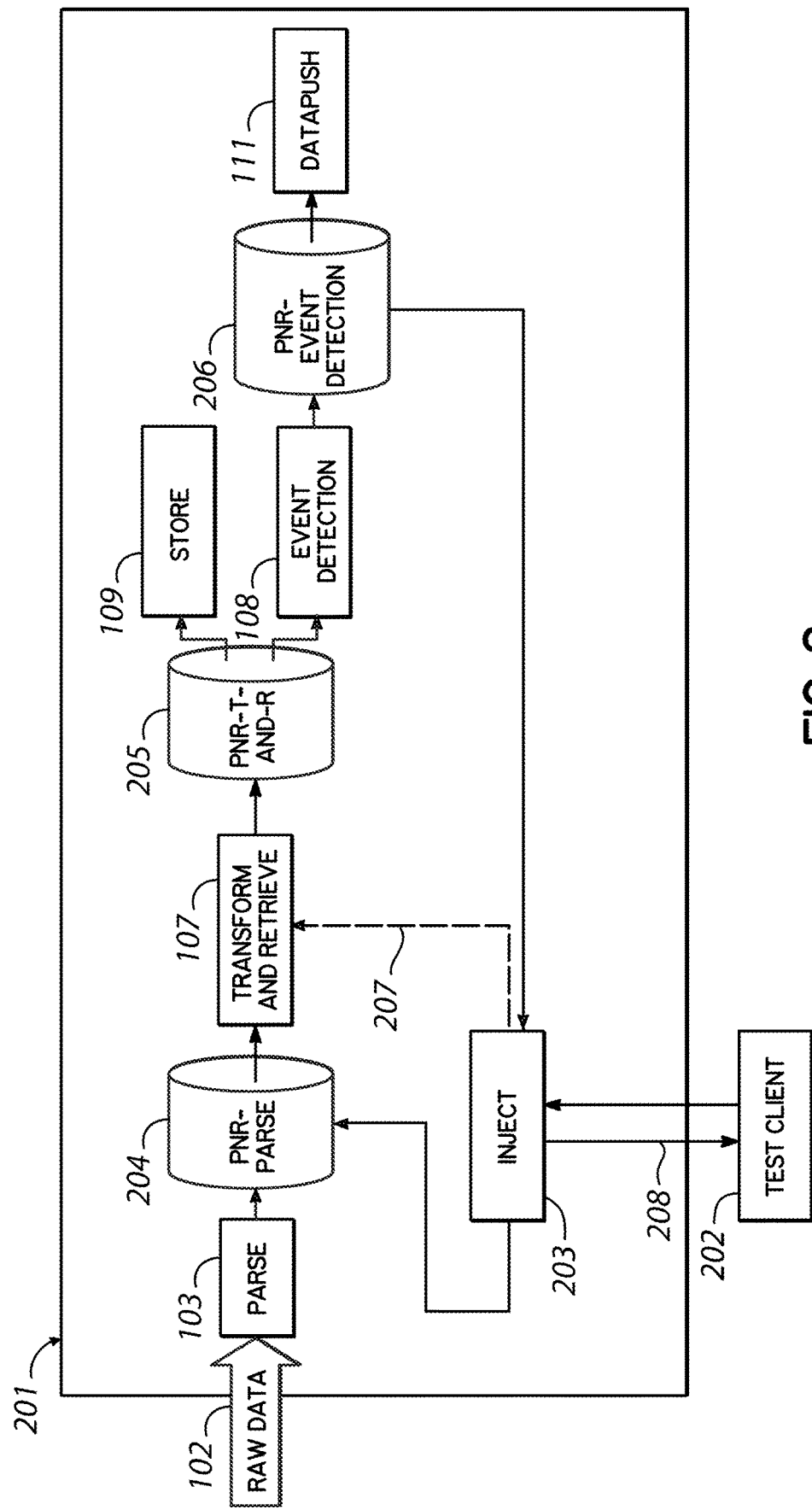
FIG. 2 shows a microservice-based platform comprising an injector according to an embodiment.

FIG. 2 shows a microservice-based platform comprising an injector according to an embodiment. FIG. 2 shows a platform 201 comprising the components described in relation to FIG. 1 where similar reference numerals refer to similar components. The platform 201 shown in FIG. 2 further comprises an injector microservice 203. The platform 201 implements a streaming architecture.

Previous applications often processed data (for example, the input data feed 102) using batch processing techniques where data was collected and analysed in groups. Batching data in this way is undesirable for applications that are designed to continuously monitor and respond to events. For these applications, it is desirable to use a streaming architecture, where data can be ingested and processed without delay.

One such stream processing platform is Apache Kafka®. Generally speaking, in a streaming platform there are producers that publish (i.e. write) events (e.g. messages) and consumers that consume (e.g. read and process) these events. In an example system a microservice may be a consumer (e.g. to obtain input data for processing by the microservice) and a producer (e.g. for generating and publishing data for processing by downstream microservices).

Kafka® uses streams (also referred to as "topics") to communicate messages between various microservices. In Kafka® the act of production and consumption are decoupled and agnostic of each other. The way that producers and consumers exchange data is through topics. In this way a topic acts as feed of information to which messages are stored and published.

In Kafka® the messages published to and/or consumed from a topic are referred to as "records". Each record comprises a key, a data value and a timestamp.

Kafka® provides a number of Application Programming Interfaces (APIs) that allow microservices to interact with the various streams of data (i.e. the Kafka® topics). These APIs include a producer API for publishing one or more records (i.e. messages) to a specified Kafka® topic and a consumer API for subscribing to one or more Kafka® topics, thereby allowing the streams of records to be received and processed by a microservice.

In the exemplary platform 201 of FIG. 2 Kafka® topics are used as communication links to communicate data between a plurality of microservices. In this way Kafka® topics represent a communication means. In particular, the platform 201 comprises three Kafka® topics, namely: a first Kafka® topic 204 named "pnr-parse", a second Kafka® topic 205 named "pnr-t-and-r" and a third Kafka® topic 206 named "pnr-event-detection", where "pnr" refers to the "Passenger Name Record" data, which is a category of data processed by the platform 201.

In FIG. 2 the parse microservice 103 is configured to publish one or more records to the first Kafka® topic 204 named "pnr-parse". The transform and retrieve microservice 107 is a subscriber to the first Kafka® topic 204 and therefore consumes the records published to it. In platform 201 the transform and retrieve microservice 107 is configured to publish one or more records to the second Kafka® topic 205 named "pnr-t-and-r". Both the store microservice 109 and the event detection microservice 108 are subscribers to the second Kafka® topic 205, thereby allowing both microservices to receive and process the records published to the second Kafka® topic 205. In a similar way the third Kafka® topic 206 named "pnr-event-detection" is used to communicate data (in the form of records) between the event detection microservice 108 and the datapush microservice 111.

Although the example above uses the Kafka® topics named: "pnr-parse", "pnr-t-and-r", "pnr-event-detection", which are associated with passenger name record (pnr) data, it is emphasised that topics associated with other types of data could be used instead or in addition. For example, in a different embodiment the topics are named: "parse", "t-and-r" and "event-detection". Optionally the topics convey data associated with data feeds including, but not limited to, ticket and/or flight information feeds.

The platform 201 further comprises an injector 203 that is communicatively connected to a test client 202. As will be discussed in more detail below, the injector 203 is configured to receive a communication from the test client 202 comprising one or more test input commands that the injector 203 is to execute and a series of output events that the injector 203 is to observe and record. In an embodiment, the injector 203 is further configured to report the outcome of the tests (including the observed output events) to the test client 202 using a bi-directional communication link 208.

In FIG. 2 the injector 203 is configured to publish records to the first Kafka® topic 204 and is also configured to subscribe to, and therefore receive records from, the third Kafka® topic 206. In this example, the injector 203 interacts with the first Kafka® topic 204 and the third Kafka® topic 206 as a producer and a consumer respectively. However, this relationship is not fixed. Instead, the communication links and therefore the communication means (e.g. the specified Kafka® topics) are configured based on the content of the communication received from the test client 202. In light of this, it is emphasized that the injector 203 is able to publish to, and subscribe to any number of different Kafka® topics.

Kafka® is typically run as a cluster on one or more servers. In an embodiment microservices, including the injector 203, produce to and consume from a Kafka® topic by using the IP address and port number of the Kafka® servers and the relevant topic name. Optionally credentials are also used to produce to and consume from a Kafka® topic where authentication is implemented.

As well as supporting communication via Kafka® topics, the microservices within the platform may also provide a RESTful interface for communication. As known in the art, a RESTful interface (also referred to as a RESTful web service or a REST API) is an application programmable interface (API) that uses HTTP requests to GET, PUT, POST and DELETE data. This represents another communication means that the microservices could use to interact with other microservices within the platform 201. Furthermore, the RESTful interface provided by each microservice may also be accessible to other entities outside of the platform 201. In essence the REST API provides another way for microservices to communicate with each other.

Using HTTP messages to communicate via a REST API represents a form of data exchange that is synchronous and 1-to-1. In contrast Kafka® streams represents an asynchronous and 1-to-many form of data exchange. REST APIs can be provided by microservices for a number of reasons. For example, REST API's can be exposed to external systems. Furthermore it is often possible to reuse existing services implemented using REST API's. Consequently, it is foreseeable that a microservice could be configured to communicate via different communication technologies e.g. Kafka® streams and a REST API, or more broadly a synchronous query/reply means and an asynchronous publish/consume streaming means.

In platform 201 the transform and retrieve microservice 107 is configured to provide a RESTful interface. In this way, the transform and retrieve microservice 107 supports two communication means (i.e. via Kafka® topics and via a RESTful interface). The functionality that is supported by each interface will depend on the configuration of the individual microservices. In FIG. 2 the injector 203 is configured to communicate with the transform and retrieve microservice 107 via two communication means. Namely, by publishing records to the first Kafka® topic 204 and by communicating (as indicated by the HTTP message 207) via a RESTful interface provided by the transform and retrieve microservice 107.

In another example the transform and retrieve microservice 107 is configured to communicate data using only Kafka® topics (e.g. the first Kafka® topic 204 and the second Kafka® topic 205).

As will be discussed further below, the communication means that are used by the injector 203 for communication with any given microservice depends on the content of the test configuration message received from the test client 202. The test configuration message can also be referred to as the test scenario message.

In the description above, two communication means have been discussed that could be supported by microservices within the platform 201 (e.g. Kafka® streams and HTTP requests). However, for the avoidance of doubt, it is emphasized that microservices could communication using any other suitable communication means. In this instance, the injector 203 is configured to communicate with microservices using any communication means supported by said microservices. In this way the two communication means discussed throughout (e.g. Kafka® streams and HTTP requests) merely represent ways to interact with the functionality of a microservice and so any suitable communication means could be used by the injector 203 provided it is capable of testing/interacting with the functionality of the microservice. For example, in an embodiment microservices within the platform 201 communicate data via at least one of: an asynchronous 1-to-N communication model (e.g. using a stream of data in a streaming architecture) and/or a synchronous 1-to-1 query/reply model (e.g. using HTTP requests and responses).

In the present context, a synchronous communication protocol refers to a communication mechanism in which the client code (i.e. the microservice transmitting a request) waits for a response to its request. In contrast asynchronous communication protocol in this context refers to a situation where the client code or the message sender doesn't wait for a response after sending a message.

FIG. 2 shows an exemplary architecture of a microservice-based platform that comprises an injector 203. However, for the avoidance of doubt it is emphasized that the microservices described in relation to FIG. 2 are merely exemplary and a platform may contain more or less microservices with the same or different functionality. In this way, the function of the injector 203 is agnostic to the number of, and the functionality provided by, the other microservices within the platform 201.

Figure 3:
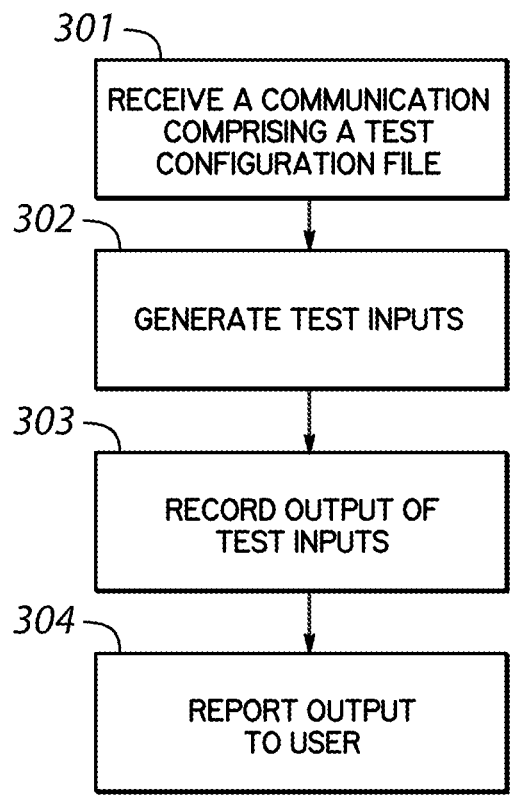
FIG. 3 shows a method implemented by the injector according to an embodiment.

FIG. 3 shows a method implemented by the injector according to an embodiment. In step 301 the injector 203 receives a communication comprising a test configuration file from a test client 202. The test configuration file comprises information indicating the test input data that is to be used as part of the test as well as information indicating the outputs to be observed and recorded during the test.

In an embodiment the communication is a HTTP POST message (i.e. a message requesting that the receiving party accepts the data enclosed within the message). Optionally, the payload of the HTTP POST message comprises the test configuration file.

In an embodiment the test configuration file is formatted as a YAML file. As known in the art, YAML is a human-readable data-serialization language commonly used for configuration files. In a different embodiment, the test configuration file is formatted using JavaScript Object Notation (JSON). As known in the art, JavaScript Object Notation (JSON) is a data interchange format that uses human-readable text to store and transmit data objects consisting of attribute-value pairs. More generally, the test configuration file can be in any format provided the injector 203 is able to decode the file contents.

In step 302 the injector 203 generates test inputs to test the functionality of a microservice. These tests inputs are based on the contents of the test configuration file. As will be discussed in more detail below, a test configuration file generally contains an indication of a communication means (e.g. HTTP or Kafka® streams), a destination for the test input data to be communicated to and/or observed from (e.g. a HTTP endpoint or a Kafka® topic), and the test input data.

Based on the received test configuration file, the injector 203 generates a communication comprising the test input data and transmits this communication using the specified communication means. As will be discussed in more detail below, where Kafka® streams are the specified communication means, this step comprises publishing a record (i.e. at least one record) comprising the test input data to the specified Kafka® topic. Likewise, where the communication mechanism is HTTP, this step comprises transmitting a HTTP message comprising the test input data to the endpoint specified in the test configuration file.

The test configuration file could configure the injector 203 for various scenarios. For example, the test configuration file could configure the injector 203 to: inject one message on a single Kafka® topic; and to intercept one Kafka® record (e.g. from a different Kafka® topic) as well as a HTTP request that is generated in response to the injected test message. Consequently, the number of test inputs, the manner in which inputs are provided, and the outputs that are to be observed are completely reconfigurable according to the contents of the test configuration file.

In step 303 the injector 203 records an output of the test. The output of the test is a microservice's output that was caused directly, or indirectly, by the test input generated in step 302. As will be discussed in more detail below, the test configuration file generally contains a point in the platform to observe. Where a microservice communicates via Kafka® streams, this point may be a specific Kafka® topic. Whereas, when the test input data is expected to generate a HTTP communication, the point in the platform to observe may be a HTTP endpoint.

The observation point specified in the test configuration file does not have to be the same as the destination of the test input data. For example, in the platform of FIG. 2 an example test configuration file may configure the injector 203 to publish a record to the first Kafka® topic 204 named "pnr-parse" and subscribe to the third Kafka® topic 206 named "pnr-event-detection". In this way the injector 203 can be configured, by the test configuration file, to observe the effect a test input has as it propagates through the platform (or in other words perform an end-to-end test). In this specific example, the test configuration file configures the injector 203 to observe the effect of the injected message once it has propagated through the transform and retrieve microservice 107 and the event detection microservice 108.

In step 304 the injector 203 reports the output of the test. In an embodiment, the output of the test comprises the communications recorded in step 303. In a further embodiment the output report is communicated from the injector 203 to the test client 202 using the same communication means (e.g. HTTP) as were used to communicate the test configuration file to the injector 203 in step 301.

Figure 4A:
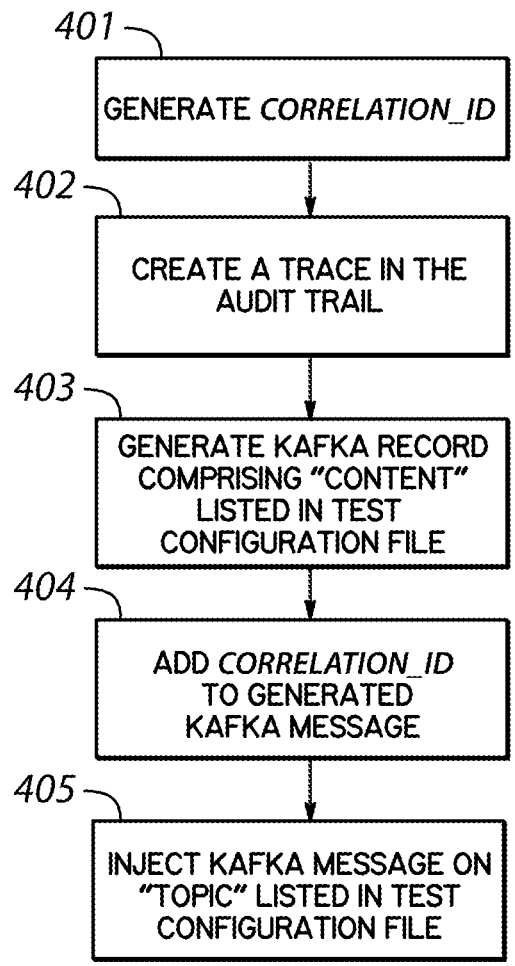
FIG. 4A shows a method of generating a test input for a Kafka stream according to an embodiment.

FIG. 4A shows a method of generating a test input for a Kafka® stream according to an embodiment. As discussed above, after receiving the test configuration file in step 301 the injector 203 parses and decodes the test configuration file to determine what inputs to generate and which outputs to observe.

When the test configuration file is formatted using YAML, the key used to indicate a test message for a Kafka® stream is the key "kafka_input". An exemplary test configuration file comprising the "kafka_input" key is shown below.

```
kafka_input:
  - topic: action-requests
    format: json-proto
    content:
    - properties:
```

-continued

```
proto-full-name: com.amadeus.pulse.message.Action
data: '{
    "id": "test",
    "version": "1",
    "actionName": "ADD_REMARK",
    "parameters": {
        "freeText": { "value": "HELLO WORLD" }
    }
}'
```

The "kafka_input" specification comprises a "topic" to which the test input data is to be published and the "data" which forms the record. In the example above the specified Kafka® topic is named "action-requests" and the test data comprises the fields "id", "version", "action Name" and "parameters".

In step 401 the injector 203 generates a correlation identification (hereinafter, correlation_id) in response to identifying a "kafka_input" request in the test configuration file. A correlation_id is an identifier that is uniquely associated with a generated Kafka input (i.e. a record published to a Kafka® topic) and is included in the record generated and published by the injector 203 in response to identifying the "kafka_input" key in the test configuration file.

Using a unique correlation_id in this way enables the origin of a message (i.e. the message that prompted the creation of the current message) to be identified. Put in other words, the correlation_id correlates generated Kafka messages with the injection. As a result, the injector 203 is able to differentiate between normal user communications and communications generated during the test, thereby enabling the platform to be reliably tested in a production environment. In an embodiment, the injector 203 only generates a correlation_id in response to identifying a "kafka_input" specification (i.e. a correlation_id is not generated for other communication means).

In a further embodiment the injector 203 generates a different correlation_id for each kafka record that will be generated. In the above example one kafka record will be generated since there is only one 'topic' specified in the kafka_input section of the test configuration file. In another example the kafka_input section of the test configuration file comprises two or more kafka_input sections, and/or two or more '-topic' entries under a single kafka_input section. In this case, more than one kafka record will be generated and published, where each record is associated with a different correlation_id.

In step 402 the injector 203 generates a trace in an audit trail. In an embodiment, the audit trail is provided by the platform 201 (i.e. a part of the environment the microservices operate within, or as part of the Software Development Kit). As known in the art, a trace is a description of a transaction as it moves through a system (which, in this case, is the platform 201). In an embodiment distributed tracing functionality is provided by OpenTracing™. In OpenTracing™ a transaction is identified by a TraceID that is found in all related audit log entries. In this way, a user can, on later inspection, identify the flow of a message throughout the platform. In an embodiment the TraceID associated with a generated communication is the correlation_id generated in step 401.

In step 403 the injector 203 generates a Kafka record comprising the values associated with the "content" key in the "kafka_input" section of the test configuration file. Using the example test configuration file shown above, the injector 203 publishes a record to the Kafka® topic named "action-requests" containing the data {"id": "test", "version": "1", "actionName": "ADD_REMARK", "parameters": {"freeText": {"value": "HELLO WORLD"}}}.

Optionally, the "kafka_input" section of the test configuration file further comprises a "format" key. This field of the test input configuration indicates the transformation to be applied to the "data" values specified in the "content" section. In the example above the "format" key is associated with the value "json-proto". In the example above the data in the "content" section is provided in (or equivalently: described using) JavaScript Object Notation (JSON) format. Consequently, in the example above the "data" values are transformed from JSON format to Protocol Buffers format.

As known in the art Protocol Buffers is an open source library that is used to serialise data structures. Protocol Buffers use binary representation that is not generally human readable. Consequently the input data is often specified in a human readable format that can be inputted and modified by a user (e.g. JSON) and a transformation is required to convert the human readable format into a format used by the platform (e.g. protocol buffers).

In an embodiment the "kafka_input" section of the test configuration file further comprises a properties field comprising a key named "proto-full-name". The value associated with this key determines which Protocol Buffers descriptor the injector 203 uses to convert the test input specification to a message binary. In the example above, the key "proto-full-name:" has the value "com.amadeus.pulse.message.Action". In this case, upon parsing the test configuration file, the injector 203 will use a protocol buffer descriptor matching "com.amadeus.pulse.message.Action" to serialise the JSON input scenario into a binary Protocol Buffers format for use inside a Kafka record.

In step 404 the injector 203 adds the correlation_id generated in step 401 to the message generated in step 403. As discussed above, each Kafka record comprises a timestamp, a key and a value. The value can also be referred to as the payload (data). In an embodiment, the correlation_id is included as part of the record's value (i.e. its payload (data)). In this way, the injector 203 is able to identify the progress of the generated message and identify messages derived from the generated message.

In step 405 the injector 203 publishes the Kafka record generated in step 405 to the "topic" specified in the test configuration file. In the example configuration file provided above, the message is published to the Kafka® topic named "action-requests".

In an embodiment, the injector 203 is configured to identify other input mechanisms during parsing of the test configuration file. For example, the injector 203 is preferably configured to generate HTTP requests based on the contents of the test configuration file in order to test a RESTful interface provided by a microservice.

Figure 4B:
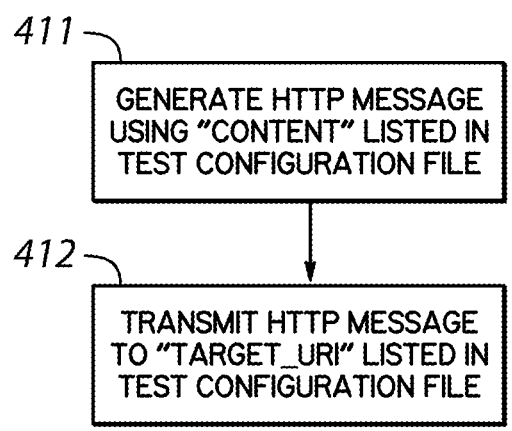
FIG. 4B shows a method of generating a test input for a RESTful interface according to an embodiment.

FIG. 4B shows a method of generating a test input for a RESTful interface according to an embodiment. As discussed above, the injector 203 is configured to determine which test inputs to generate in response to receiving a test configuration file in step 301. Where the test configuration file is formatted using YAML, an instruction to generate a HTTP input is identified using the key: "http_input". An exemplary test configuration file comprising this key is shown below:

```
http_input:
- method: POST
    timeout: 5000
    target_uri: http://action-add-pnr-elements/api/notify-pnr-owner
    headers:
        Content-Type: application/json
    format: json
    content_header:
        pulse-log-level: DEBUG
    content:
    - data: '{
        "RecordLocator": "ABC123",
        "freeText": "HELLO WORLD"
        }'
```

In step 411 of FIG. 4 the injector 203 generates a HTTP message comprising the content specified in the "http_input" section of the test configuration file. In the example above, the generated HTTP message comprises data values '{"RecordLocator": "ABC123", "freeText": "HELLO WORLD"}'.

In step 412 the injector transmits the HTTP message generated in step 411 to the endpoint specified in the http_input section of the test configuration file. In the example above, the endpoint of the generated HTTP message is specified by the key "target_uri" which, in this case, has the value "http://action-add-pnr-elements/api/notify-pnr-owner".

In an embodiment the platform is an OpenShift™ platform. OpenShift™ is an open-source container-based application platform that can be used for managing microservice environments. OpenShift™ provides hostname resolution. Consequently, URIs can point to applications using the service names provided in the test scenario file (i.e. the YAML file).

In an embodiment, the "http_input" section of the test configuration file comprises an indication of the data format included in the input specification. This indication is provided by the value associated with the key named "format". In the example above, the value associated with the key named "format" is "json", thereby signifying that the data fields of the "http_input" section are formatted using JSON.

The injector 203 can also support data field formats. For example, the exemplary configuration file below shows a configuration file comprising a "http_input" specification where the data field is formatted as raw bytes (base 64 encoded) as indicated by the value "raw" being associated with the key "format".

Both of the exemplary "http_input" sections shown above also comprise a key named "method" with the associated value "POST". HyperText Transfer Protocol (HHTTP) provides a defined set of methods to indicate the desired action to be performed upon receipt of a message e.g. GET, HEAD, POST, PUT, DELETE etc. In step 411 a HTTP message is generated that comprises the method specified by the value associated with the key "method".

As well as generating input messages in response to receiving a test configuration file, the injector 203 is also configured to observe and identify outputs specified in the test configuration file.

Figure 5:
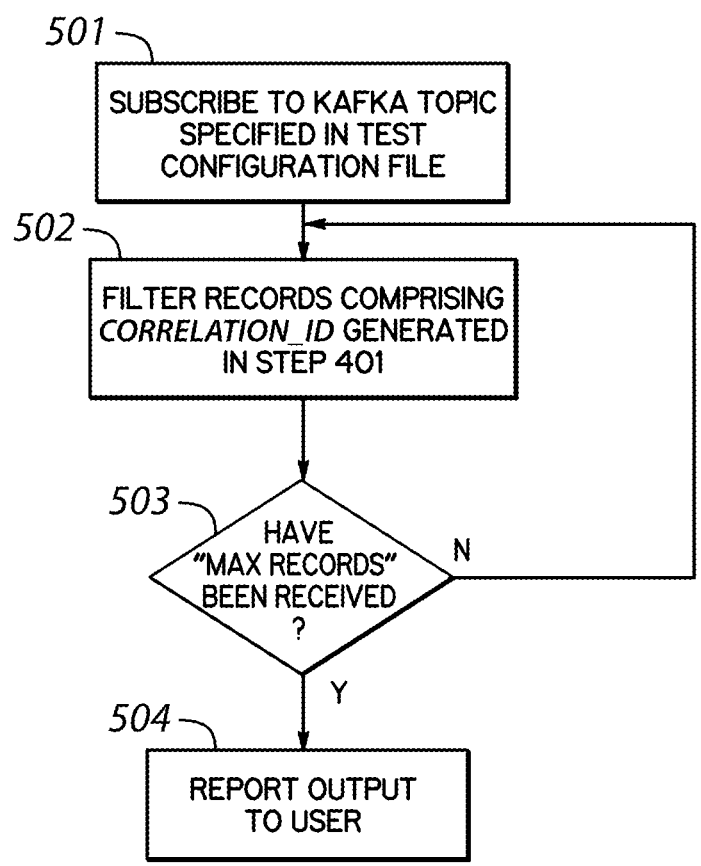
FIG. 5 shows a method of observing the output of a Kafka topic according to an embodiment.

FIG. 5 shows a method of observing the output of a Kafka topic according to an embodiment. The method shown in FIG. 5 is carried out by the injector 203 if, upon parsing the test configuration file, the injector identifies a key named "kafka_output". An exemplary test configuration file comprising a "kafka_output" key is shown below.

```
kafka_output:
- topic: action-executed
    format: proto-json
```

In step 501 the injector 203 subscribes to the Kafka topic associated with the key "topic" in the test configuration file. In the exemplary test configuration the shown above, the value "action-executed" is associated with the key "topic". In light of this, the injector 203 subscribes to the Kafka topic named "action-executed".

In step 502 the injector 203 records Kafka records published on the specified Kafka topic (i.e. "action-executed" in the example above) that comprise the correlation_id generated as part of a Kafka input message in step 401. Accordingly, the correlation_id referred to in step 502 of FIG. 5 is the same as (i.e. is identical to) the correlation_id generated in step 401 of FIG. 4A. In this way, the injector 203 only records Kafka messages (i.e. Kafka records) that have been generated in response to the inputs specified in the test configuration file.

As an example, in step 401 of FIG. 4A the injector generates a Kafka record with a correlation_id equal to "abc123". The injector 203 then publishes this Kafka message to the first Kafka® topic 204 named "pnr-parse". In response to receiving the test configuration file comprising a kafka_output field specifying the topic "pnr-event-detec-

```
http_input:
- method: POST
    timeout: 5000
    target_uri: http://action-add-pnr-elements/api/notify-pnr-owner
    headers:
        Content-Type: application/json
    format: raw
    content:
    - rawData:
eyAiUmVjb3JkTG9jYXRvciI6ICJBQkMxMjMiLCAiZnJ1ZVR1eHQiOiAiSEVMTE8gV09STEQiIH0
=
```

Both of the exemplary "http_input" sections shown above comprise a key named "timeout". The effect this key has on the behaviour of the injector 203 will be discussed in more detail in relation to the "http_output" method. However in essence, this key-value pair determines how long the injector 203 will wait for a response to the HTTP message transmitted by the injector in step 412.

tion", the injector 203 is also configured to subscribe to the third Kafka® topic 206 named "pnr-event-detection" and filter records having a correlation_id equal to "abc123". In an embodiment filtering comprises recording only those records that match the filter criteria and ignoring all other records. In a further embodiment records with a matching correlation_id (i.e. a record with a correlation_id equal to "abc123" in the example above) are recorded in a memory that can be accessed by the injector 203 for future analysis or reporting.

Although in the example above the injector 203 publishes Kafka messages to the first Kafka® topic 204 named "pnr-parse" and subscribes to the third Kafka® topic 206 named "pnr-event-detection", it will be appreciated that the injector 203 could be configured, based on the test configuration file, to publish to and subscribe to any of the Kafka® topics used within the system.

In an embodiment, the injector 203 is configured to subscribe to more than one Kafka topic and filter messages comprising the correlation_id from each of these Kafka topics. An example configuration file for this test scenario is shown below:

```
kafka_output:
- topic: sdk-streaming-demo-a
  format: proto-json
- topic: sdk-streaming-demo-b
  format: proto-json
```

Optionally, the method further comprises step 503. In step 503 the injector 203 determines whether "max_records" have been received. Whether or not the injector 203 performs this step depends on whether the key "max_records" is specified in the test configuration file. An example of a test configuration file comprising this key is shown below:

```
max_records: 2
kafka_input:
- topic: action-requests
  format: json-proto...
```

In an embodiment the injector 203 is configured to wait until it has received (after filtering) a number of Kafka records equal to "max_records" before further processing of the records when the key "max_records" is present in the test configuration file. In the example above the injector 203 is configured to wait until two filtered records (i.e. two Kafka records comprising a matching correlation_id) have been received by the injector 203.

Using a "max_records" field in this way allows the injector 203 to determine when all of the expected records (i.e. the records that the tester expects to be generated in response to the kafka_input stimuli) have been received. This is useful because a single input message can generate any number (i.e. 0 to many) of output messages. Consequently, observing a number of records ensures that the output generated by the test input is accurately captured. Furthermore using a "max_records" field to determine when to process the captured records allows the results to be returned to the test client 202 as soon as the expected results are available, thereby accelerating the testing campaign compared to waiting for a fixed timeout to expire.

If a number of records equal to "max_records" has not been received, the injector 203 is configured to wait until further Kafka records are received. If "max_records" have been received, the injector 203 reports the output of the test to a user in step 504. Optionally, the output of the test comprises the filtered records received in step 502. Preferably, reporting to the user in step 504 comprises transmitting a HTTP message to the test client 202.

Where the test configuration file does not contain the field "max_records", the injector 203 will report the filtered record to the user 504 after a timeout has been reached. In one example the injector 203 is configured to report the filtered records (e.g. to a test client 202) after a duration of time, specified by a timeout value, has expired since the input stimuli (e.g. that was generated in response to parsing the kafka_input section of the test configuration file) was transmitted. In an embodiment the injector 203 does not report an error when no "max_records" field is specified and the injector 203 uses the timeout to determine when to end the test.

In a further embodiment the output communicated to the user comprises the correlation_id such that a user can inspect the transaction/message flow in the audit trail.

Where the kafka_output section of the test configuration file comprises a key named "format", the injector 203 will report the filtered records (e.g. to the test client 202) in the specified value associated with this key. In the example provided above, the filtered messages will be format in (i.e. converted to) JSON for reporting.

Figure 6:
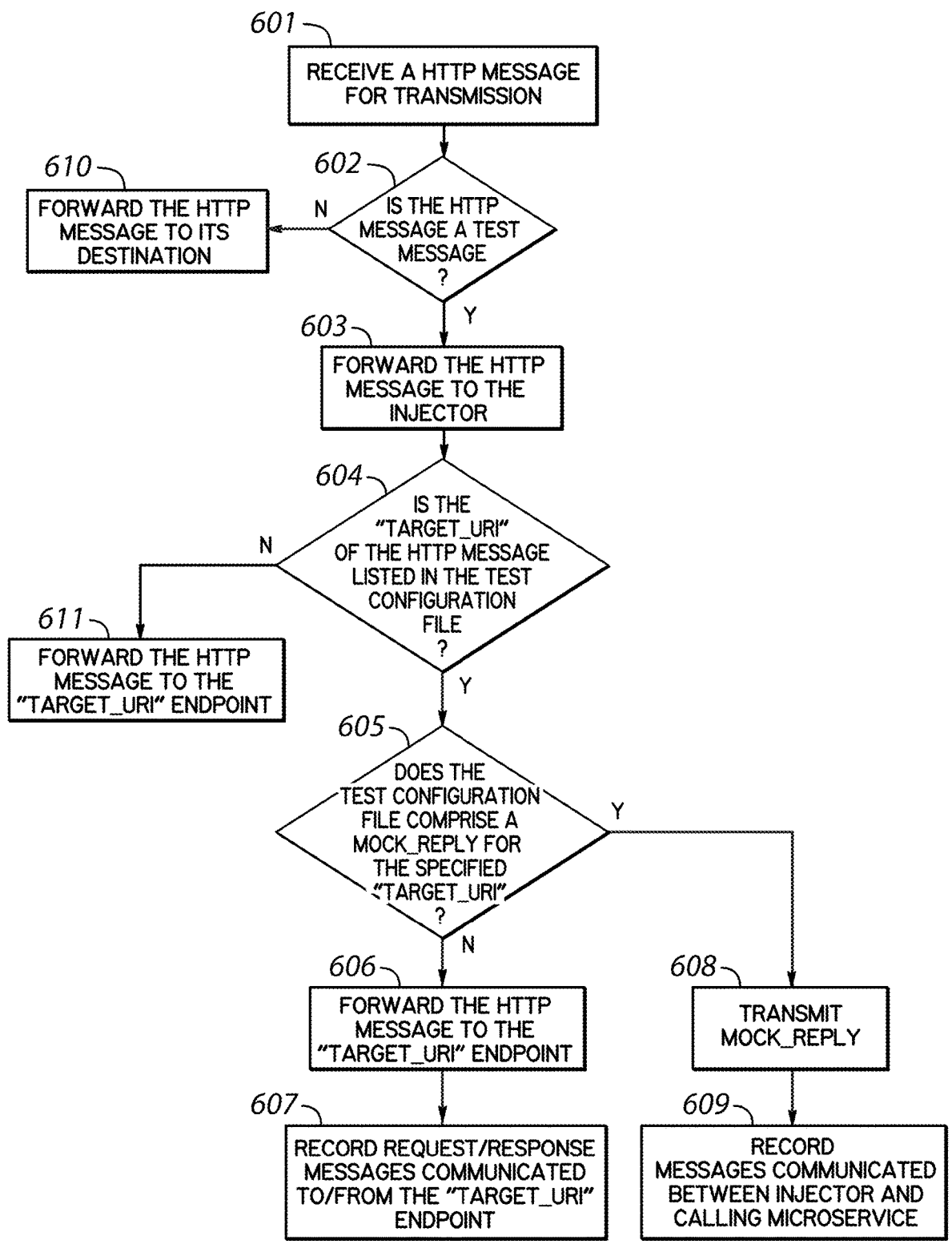
FIG. 6 shows a method of observing a HTTP output according to an embodiment.

FIG. 6 shows a method of observing a HTTP output according to an embodiment. Upon parsing the test configuration file and identifying a key named "http_output" the injector 203 is configured to implement the method shown in FIG. 6. An exemplary test configuration file comprising the key "http_output" is shown below.

```
http_output:
- target_uri: http://action-registry/api/actions/ADD_REMARK
  format: json
```

A Hypertext Transfer Protocol (HTTP) client is used by at least one microservice to communicate HTTP messages with other microservices within the platform 201 and optionally with external services. Each microservice in the platform 201 that uses a HTTP client preferably uses a HTTP client provided by a Software Development Kit (SDK) for this purpose. In an embodiment each microservice in the platform comprises a HTTP client provided by the Software Development Kit (SDK).

In an embodiment the SDK HTTP client is configured to determine whether the HTTP message to be transmitted by the HTTP client is a test message. Optionally the HTTP message comprises a field in a header of the message that indicates the message is a test message. Preferably the HTTP message comprises a baggage header and the baggage header comprises an indication that the HTTP message is a test message. A test message in this context includes a communication that is directly or indirectly generated by the stimuli (e.g. input messages) present in the test configuration file.

In an embodiment a microservice is configured to generate a HTTP message for transmission comprising the indication that the HTTP message is a test message, optionally in the baggage header of the HTTP message, in response to receiving a HTTP input message that comprises an indication that the HTTP input message is a test message. Or in other words, the HTTP output message generated in response to receiving a HTTP input message inherits the indication that the message is a test message.

In another embodiment, the microservice is configured to identify that a kafka input record is a test message (e.g. by identifying the presence of a correlation id) and, in response, generate a HTTP output message for transmission comprising an indication that the HTTP message is a test message, optionally within the baggage header of the HTTP message.

In step 601 the method begins by receiving a HTTP message for transmission. Optionally the HTTP message is generated by a microservice that also comprises the HTTP client.

In step 602 the HTTP client of the microservice determines whether the HTTP message received in step 601 is a test message. Optionally the HTTP client is configured to determine whether there is an indication in a baggage header of the HTTP message that the message is a test message.

If the HTTP client of the microservice determines, in step 602, that the HTTP message to be transmitted is not a test message then the method proceeds to step 610 where the HTTP message is forwarded (i.e. transmitted) by the HTTP client to the destination specified in the HTTP message.

If the HTTP client of the microservice determines, in step 602, that the HTTP message to be transmitted is a test message then the method proceeds to step 603. In step 603 the HTTP client forwards (i.e. transmits) the HTTP message to the injector 203. Or in other words, the HTTP client proxies the HTTP call through the injector 203. The injector 203 subsequently receives the HTTP message from the HTTP client of the microservice.

In step 604 the injector 203 determines whether the "target_uri" of the received HTTP message is listed in the test configuration file. Or in other words, the injector 203 determines whether the "target_uri" is defined as part of the testing scenario, that is to say the injector 203 determines whether the HTTP message directed to a "target_uri" endpoint that is listed in the 'http_output' section of the test configuration file.

If the injector 203 determines, in step 604, that the "target_uri" of the HTTP message is not specified in the test configuration file, then the method proceeds to step 611. In this case the injector 203 forwards the HTTP message to the "target_uri" endpoint and acts like a proxy. Optionally the HTTP message, and any responses from the "target_uri" endpoint are not recorded (e.g. in a log file) by the injector 203.

If the injector 203 receives a message with a destination corresponding to a "target_uri" endpoint listed in the 'http_output' section of the test configuration file then the method proceeds to step 605.

In step 605 the injector 203 determines whether a mock reply exists for the received HTTP message. Specifically, the injector 203 determines whether the test configuration file comprises a mock reply for the HTTP message that is destined for the "target_uri" endpoint.

In an embodiment, the injector 203 is configured to transmit a mock reply if the "http_output" section of the test configuration file contains a mock reply as indicated by the key "mock_reply".

In general a mock reply is a HTTP message generated by the injector 203 in response to receiving a HTTP message. A mock reply message is used to simulate a message that would be generated by the endpoint (i.e. "the target_uri") in response to received message generated by the microservice under test. Using mock replies in this way limits the impact on the platform/external systems by not calling some services.

Returning to step 605, if the "http_output" output section of the test configuration file does not comprise a "mock_reply" key the method proceeds to step 606 where injector 203 allows the received message to "pass through" the injector to the specified "target_uri" endpoint. In other words, where the test configuration file does not comprise a "mock_reply" the injector 203 will route the received message to the "target_uri" endpoint upon receipt. In this way the injector 203 does not interfere with the flow of messages within the platform 201 but can still record the exchange of message for further analysis. In this case, the injector 203 calls the HTTP endpoint (i.e. the "target_uri") and receives the response from the endpoint. The response will in turn be returned to the caller (i.e. the microservice that transmitted the original HTTP test message destined for the "target_uri"). In this way the injector 203 acts like a HTTP proxy.

In step 607 the injector 203 records all messages directed to and from the "target_uri" endpoint.

In another example, the "http_output" section of the test configuration file comprises a "mock_reply". An example test specification comprising a "mock_reply" key is shown below.

```
http_output:
- target_uri: http://nodeA1.test.webservices.amadeus.com/
  1ASIWGEN6XM
    format: raw
    mock_reply:
      status_code: 200
      headers:
        Content-Type: "text/xml; charset=utf-8"
      format: raw
      content:
      - data: '<?xml version="1.0" encoding="UTF-8"?>
          <SOAP-ENV:Envelope xmlns:SOAP-
ENV="http://schemas.xmlsoap.org/soap/envelope/"
xmlns:awsse="http://xml.amadeus.com/2010/06/Session_v3"
xmlns:wsa="http://www.w3.org/2005/08/addressing">
            <SOAP-ENV:Header>
              <wsa:To>... </wsa:To>
              <wsa:From><wsa:Address>... </
wsa:Address></wsa:From>
              <wsa:Action>... </wsa:Action>
              <wsa:MessageID>... </wsa:MessageID>
              ...
            </SOAP-ENV:Header>
            <SOAP-ENV:Body>
              <PNR_Reply xmlns="http://xml.amadeus.com/
                PNRACC_15_1_1A">
                <pnrHeader>... </pnrHeader>
                ...
              </PNR_Reply>
            </SOAP-ENV:Body>
          </SOAP-ENV:Envelope>'
```

In the example above, the data values for each of the HTML tags in the mock reply have been replaced with " . . . " for the sake of brevity.

If, in step 605, the injector 203 determines that the "http_output" section of the test configuration file comprises a key named "mock_reply" then the injector 203 will transmit a mock reply in step 608.

The mock reply transmitted in step 608 is generated according to the keys and values contained within the "mock_reply" section of the test configuration file. In the example above, the mock reply contains the data associated with key "data". In the example above, this data is provided in its raw format (as is apparent from the key-value "format: raw").

The mock reply section of the "http_output" specification may also comprise other parameters that are generated as part of a HTTP message. For example, HTTP messages often comprise status codes that are issued in response to a received message. An example of this can be seen above where the mock reply contains a key named "status_code" and has an associated value of "200" (indicating that the request was successfully received, understood, and accepted). This status code will be included in the mock reply transmitted by the injector 203 in step 608.

Unlike in step 605, if a mock_reply is present in the http_output specification, the injector 203 will not permit the received message to "pass through" the injector to the target endpoint. Instead, messages received by the injector 203 will be recorded and a mock reply will be generated in response (i.e. the received message will not be forwarded to the "target_uri" endpoint).

In step 609 the injector 203 records the message directed to the "target_uri" endpoint (i.e. the HTTP message that prompted the mock reply). Optionally the injector 203 records the message content and the time of the messages in a log file. In step 609 the injector also records the transmission of the mock reply to the caller (i.e. the microservice that transmitted the original HTTP test message destined for the "target_uri").

The test configuration file may also comprise a key named "timeout". For example:

timeout: 10000

When the test configuration file comprises a key named "timeout", the value associated with this key is used by the injector 203 when performing the method of FIG. 6. In particular, the injector 203 is configured to determine whether a duration of time (corresponding to the 'timeout' value) has elapsed without the called service answering.

The timeout functionality is used when the injector 203 acts like a HTTP proxy (i.e. when the injector 203 is not configured to transmit a mock reply). As discussed above, in this case the injector 203 calls the HTTP endpoint (i.e. the "target_uri") in response to receiving a HTTP message from a calling microservice, thereby acting like a proxy. When a timeout value is specified in the test configuration file the injector 203 is configured to determine whether a response to the HTTP message forwarded by the injector 203 to the HTTP endpoint (i.e. the "target_uri") is received within a duration of time (i.e. the timeout) from transmission by the injector 203.

If it is determined that the timeout time has not expired the injector 203 will wait to receive a response message from the "target_uri". If the injector does not receive a response from the called HTTP endpoint (i.e. the "target_uri") before the timeout expires then the injector 203 will stop waiting for a response and return an error.

In an embodiment, the value associated with the key "timeout" is specified in milliseconds. In the example provided above, the injector 203 is configured to set a timeout counter to run for 10000 milliseconds (i.e. 10 seconds).

If there is no "timeout" key specified in the received test configuration file, then the injector 203 uses a predetermined default timeout value.

In the examples presented above, the injector 203 tests one or more microservices in the platform 201 using communication means that are interceptable by injector 203. For example, where the microservice under test communicates via Kafka streams the injector 203 is able to subscribe to (and therefore receive records from) the streams that said microservice uses for communication. Likewise, where the microservice under test communicates using HTTP messages the injector 203 is able to intercept such messages by virtue of the HTTP client being configured to use the injector 203 as a proxy for test messages. However it is anticipated that there could be some microservices (often referred to as boundary microservices) that do not communicate using means that are readily interceptable.

For example, a microservice may communicate using IBM MQ (an enterprise messaging solution to exchange messages between applications). At least two issues could arise when using another communication mechanism such as IBM MQ (hereinafter "MQ") to communicate messages.

Firstly data written on MQ is consumed by consumer systems. These consumer systems may not be able to identify that the message is a test message and therefore cannot distinguish between live data and test data.

Secondly communication mechanisms such as IBM MQ do not support the possibility of several consumers consuming the same data. Consequently, the injector 203 is not able to listen to an MQ stream, like it could for example with a Kafka topic which supports 1-to-many communications. In light of this, in an embodiment the platform 201 is configured to use a modified communication client that enables microservices to be accurately tested despite communicating using technologies that are not readily interceptable.

In an embodiment the platform 201 comprises a microservice that is configured to produce (i.e. transmit) a message on the IBM MQ communication mechanism. This microservice is referred to the "MQ connector". In the platform 201 according to an embodiment the "MQ connector" is configured to call (i.e. communicate with) the injector 203 in order to determine whether the "MQ connector" microservice is required to record information as part of the test. Optionally the "MQ connector" transmits a HTTP call (i.e. HTTP message) to the injector 203 in order to determine whether the "MQ connector" microservice is required to record information.

In an example, the "MQ connector" microservice is configured to receive a message that is to be transmitted on the MQ communication mechanism. Optionally the "MQ connector" microservice is configured to receive messages via a Kafka® stream (e.g. by subscribing to a Kafka topic). In response to receiving the message that is to be transmitted on the MQ communication mechanism, the "MQ connector" microservice determines whether the received message is a test message. For example, by determining whether the Kafka record received on the Kafka topic comprises an indication that the message is a test message.

If it is determined that the received message to be transmitted on MQ is a test message, then the "MQ connector" microservice transmits a request to the injector microservice 203 to obtain information indicating which messages are to be recorded and reported by the "MQ connector". The injector 203 transmits the information that is to be recorded (also referred to as the configuration) to the "MQ connector" microservice in response to receiving the request. Optionally the "MQ connector" and the injector 203 microservice communicate with each other by HTTP.

In response to receiving the configuration (or in other words, the information indicating which test messages are to be recorded), the "MQ connector" microservice determines whether the received test message fulfils the criteria specified in the configuration. In one example, determining whether a test message is to be recorded comprises determining whether the properties of the message (e.g. its original, description and/or payload ID) match an entry in the received configuration. In response to determining that the received test message does fulfil the criteria, the "MQ connector" is configured to record the test message and/or information associated with the test message (e.g. its contents, time of receipt etc.) and transmit the recorded information to the injector 203 for subsequent reporting to a user.

If the message received by the "MQ connector" microservice is identified as a test message, then the message is not written to "MQ" (or in other words, the test message is not transmitted by the "MQ connector" microservice on the MQ communication mechanism).

This functionality is referred to herein as manual reporting. An example test configuration file that causes the injector 203 to use the manual reporting functionality is shown below.

```
report_output:
 - origin: datapush-mq
   description: TEST.QUEUE
   format: raw
```

In this example, upon receiving a message identified as a test message, the "MQ connector" microservice is configured to transmit a request to the injector microservice for the manual reporting configuration. In response to receiving the HTTP call from the "MQ connector", the injector 203 transmits the manual reporting configuration to the "MQ connector" microservice using HTTP. Optionally, the manual reporting configuration transmitted by the injector 203 corresponds to the "report_output" section of the test configuration file.

The "MQ connector microservice" then compares information received in the HTTP message specifying the manual reporting configuration with the properties of the received message that is identified as a test message to determine whether the criteria for manual reporting is satisfied, or in other words whether the test message received by the "MQ connector" should be recorded and reported. Optionally the manual reporting configuration received from the injector 203 comprises an origin of the MQ message and a description of the MQ message, and the "MQ Connector" microservice determines whether the origin and the descriptor of the test message matches those listed in the "report_output" section of the test configuration file.

If the properties of the test message (e.g. its origin and description) match those specified in the manual reporting configuration, then the "MQ connector" microservice records information associated with the test message (e.g. the message contents, time of receipt of the test message etc.) and reports the recorded information to the injector 203. The "MQ connector" microservice does not publish the test message on "MQ". Consequently, the message is not transmitted by the "MQ connector" microservice.

Optionally, the report output may also specify a filter to skip some messages, for example:

```
report_output:
 - origin: datapush-mq
   description: TEST.QUEUE
   format: raw
   filter:
     payload:
       id: ABCDEF-2018-11-08
```

In this case the manual reporting configuration received from the injector 203 imposes a requirement on the data associated with the test message received by the "MQ connector". Optionally the requirement relating to the data includes a requirement relating to a payload of the message. In this example the "MQ connector" microservice is configured to determine whether the payload of the test message received by "MQ connector" microservice matches the filter criteria listed in the "report_output" of the test configuration file (which is reported to the "MQ connector" microservice by the injector 203 in response to receiving a request from the "MQ connector").

In response to receiving the configuration described above, the "MQ connector" microservice is configured to determine whether the data associated with the test message received by the "MQ connector" has a payload with id values: "ABCDEF-2018-11-08". If the received test message satisfies the filter, then the "MQ Connector" records information associated with the test message (e.g. the content of the received test message and/or the time of the received test message etc.). The "MQ connector" microservice subsequently transmits the recorded information to the injector 203.

In another example, the request for the manual reporting configuration is only transmitted once during each test and the "MQ connector" microservice is configured to store a copy of the configuration in memory the first time it is received, and subsequently retrieve the configuration when the "MQ connector" receives further test messages to be transmitted on MQ.

Although the IBM MQ communication mechanism is used in this example it will be appreciated that similar modifications to the another microservice that is provided to communicate on a different communication mechanism could be made, especially where the communication mechanism has similar properties as IBM MQ (e.g. not allowing multiple recipients).

Figure 7:
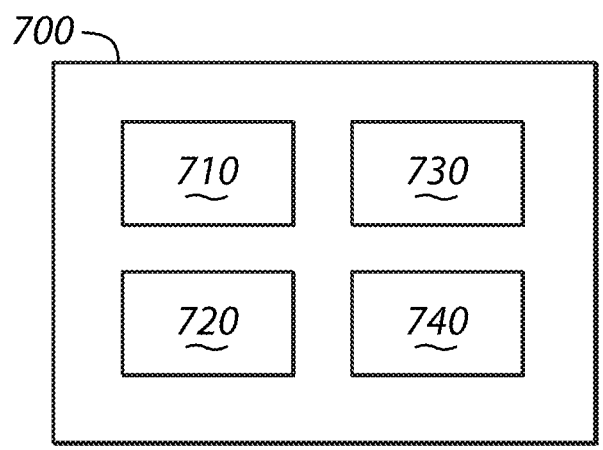
FIG. 7 shows an implementation of the platform according to an embodiment.

FIG. 7 shows an implementation of the platform according to an embodiment. The device 700 comprises an input module 710, a processor 720, a non-volatile memory 730 and an output module 740. The input module 710 is configured to receive communications from a network. In an embodiment, the input module 710 is configured to receive raw data 102, data from other platforms or systems and communications from a test client 202. In general, the input module 710 is configured to enable communication by various means with other systems.

The device 700 further comprises a processor 720. The processor 720 is communicatively coupled to non-volatile memory 730. Memory 730 stores computer program instructions that, when executed, cause the processor 720 to execute program steps that implement the functionality of the platform 102. As discussed above, platform 102 comprises a plurality of interconnected microservices. In light of this the computer program instructions, when executed, create a plurality of interconnected microservices.

The computer program instructions further comprise computer code which, when executed by the processor, create a microservice that implements the functionality of the injector 203 as discussed above.

The processor 720 is also communicatively coupled to the output module 740. The output module 740 is configured to communicate information to outside entities. In an embodiment, the output module 740 is configured to communicate, in particular the results of a test, with a test client 202.

Whilst in the embodiments described above the components of the device are shown to be co-located, it will be appreciated that part of, or all of, any module may be implemented in a different location. For example, in an embodiment the non-volatile memory 730 comprises an archive and an operational data store for cold and hot storage respectively. In an embodiment, these two types of storage are distributed in two different locations.

Figure 8:
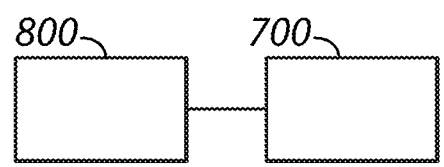
FIG. 8 shows a system comprising the device 700 communicatively coupled to a test client.

FIG. 8 shows a system comprising the device 700 communicatively coupled to a test client. In an embodiment, the connection between the two systems is established via the output module 740 of the device 700. In a further embodiment the device 700 is communicatively coupled to another device (not shown) implementing another platform comprising microservices.

Figure 9:
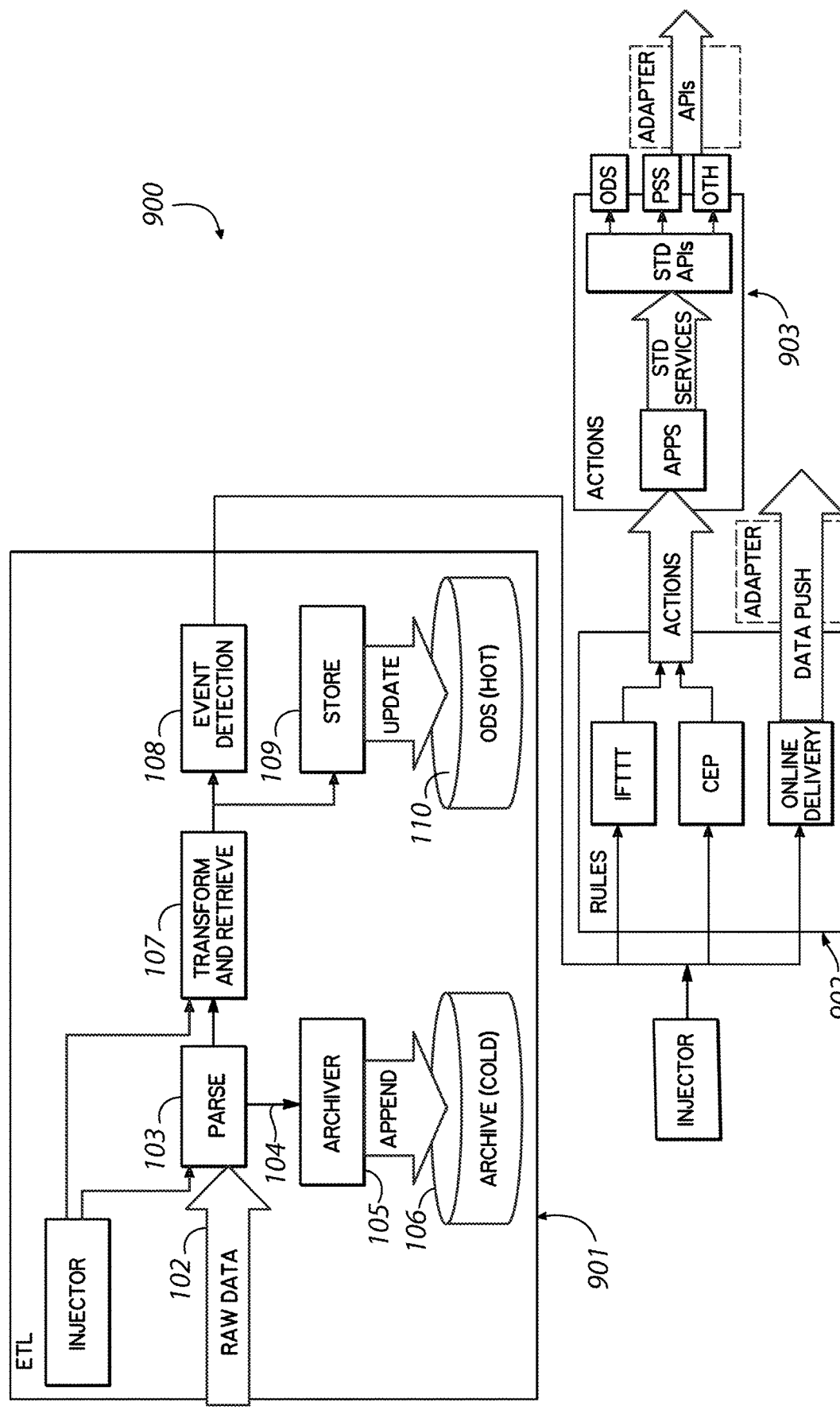
FIG. 9 shows an exemplary use of the injector according to an embodiment.

FIG. 9 shows an exemplary use of the injector according to an embodiment. FIG. 9 shows an airline agility hub 900 comprising a plurality of platforms, each comprising a plurality of microservices. The airline agility hub 900 further comprises a plurality of injector microservices as discussed above. The airline agility hub 900 is a platform based on a streaming architecture, in which data can be injected and ingested. In an embodiment, the data is used by airlines to gather intelligence on their operations and act upon said intelligence. The airline agility hub 900 comprises three modules. The first of these being an extract, transform and load module 901 (hereinafter referred to as the "ETL" module), the second of these being a rule module 902 and the third of these being an actions module 903. The atomic entity of each module is a microservice. In the airline agility hub 900 microservices communicate via. Kafka topics based on the streaming concept of "producer/consumer" and/or HTTP calls.

In the airline agility hub 900 a raw data feed is fed to the ETL module 901 and is ingested by the ETL components (i.e. the microservices logically within the ETL module 901) which store the data in an operational data store and an archive. In an embodiment, the rule module 902 is implemented using an "If-This-Then-That" concept such that actions (e.g. applications designed and implemented by the manufacturer of the airline agility hub and/or third parties) are triggered depending on a trigger (i.e. an event) and the data content (i.e. a criteria).

The airline agility hub 900 shown in FIG. 9 further comprises two injector microservice instances that are configured to injected data at different points in the airline agility hub 900. The injector microservices allow the airline agility hub 900 to be tested in a production environment, thereby allowing the impact of any changes to the platform to be accurately determined. Although FIG. 9 shows two injector microservice instances, it is emphasized that a single injector microservice instance can run many different tests in parallel (including tests that produce/consume to/from different topics/endpoints).

As discussed above, the injector microservice is preferably used in a streaming architecture and is configured to inject messages and issue requests to internal services, as well as record the responses and side effects of these messages and requests. The injector microservice is also configured to dynamically isolate the microservices under test (e.g. only during injected message/request processing) to avoid external side effects and confine tests to the platform. This is done on a per message basis where each instance of a micro-service is tested using 1 message at a time. This functionality allows the user to run various scenarios and record the output of those scenarios.

In FIG. 9 the test injection is represented by a YAML file that describes what to inject and which output to expect. In the embodiment of FIG. 9, a YAML file is sent to each injector microservice in the body of a respective HTTP request. In response the injector microservices both initiate new traces in the audit trail and record all outputs that match the generated correlation_id. In keeping with the functionality discussed above, the YAML test configuration file may contain one or more of the following:

Kafka input—a list of messages to be written to different topics on the platform. All the written messages will be correlated with the injection. Formats usually targeted are pulse messages.

HTTP input—a list of HTTP requests to inject on services of the platform. Hostname resolution happens inside Openshift, thus URIs can point to applications using their service names, and does not require applications to be exposed with the router.

Kafka output—is a list of topics from which expected messages will be read, optionally as effects of the injected data (Kafka input or HTTP input). The injector microservices will poll the specified Kafka topics at polling timeout and will record the correlated messages.

HTTP output—is a list of HTTP endpoints that are either: called, or prompt a mock reply from the injector, in response to receiving a HTTP message directed to said endpoint. This is achieved by the injector behaving as a proxy for HTTP requests issued by services on the platform, both towards internal and external services.

In the airline agility hub 900 of FIG. 9 the injector microservices are configured to return the correlation_id to a test client so that the trace, corresponding to the injected message, can be looked up in the audit trail at a later time.

Advantageously the injector allows a user to quickly and effectively test a platform comprising one or more microservices at any stage of the development process. Embodiments of the injector allow a microservice, and more particularly a platform comprising microservices to be tested in a production environment (i.e. without having to reconfigure the raw input data).

Using the injector microservice enables the functionality of a code/product to be tested without relying on a "real live" feed being plugged into the platform. However, for the avoidance of doubt, it is noted that the injector also permits testing while a "real live" feed is connected to the platform. The injector microservice can also be dynamically configured to run a test with a granularity from a single microservice to a full end-to-end test. Preferably, the injector microservice is used for quick tests/prototyping of a microservice. Optionally, the injector can also be used in automated integration tests. In this case the injector is configured to operate within a framework, including but not limited to, the ROBOT framework).

While certain arrangements have been described, the arrangements have been presented by way of example only and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A computer-implemented method for testing a functionality of a microservice-based computing platform, the computing platform comprising a first microservice and an injector microservice, the method comprising:
    receiving, by the injector microservice, a test configuration file from a test client;
    determining from the test configuration file:
        a test input message;
        a test input communication mechanism; and
        a test output communication mechanism;
    generating a test identifier for identifying that a message is being used for testing purposes;
    transmitting, by the injector microservice, the test input message to the first microservice using the test input communication mechanism, wherein the test input message comprises the test identifier;

identifying, by the injector microservice, an output message transmitted via the test output communication mechanism, wherein the output message comprises the test identifier;

recording, by the injector microservice, the output message comprising the test identifier; and reporting a test output to the test client, wherein the test output comprises the recorded output message.

2. The computer-implemented method of claim 1 wherein the test input communication mechanism is a first data stream, and transmitting, by the injector microservice, the test input message comprises:

generating a first data record comprising the test input message; and publishing the first data record to the first data stream.

3. The computer-implemented method of claim 2 wherein the test output communication mechanism is a second data stream, the test identifier comprises a correlation identification value, and identifying, by the injector microservice, the output message transmitted via the test output communication mechanism comprises:

subscribing to the second data stream; and identifying a second data record published to the second data stream comprising the correlation identification value.

4. The computer-implemented method of claim 2 wherein the test configuration file further comprises a first limit associated with a predetermined threshold, and identifying the output message transmitted via the test output communication mechanism comprises:

identifying a number of output messages transmitted via the test output communication mechanism, wherein the number of output messages is greater than or equal to one.

5. The computer-implemented method of claim 4 further comprising:

determining, by the injector microservice, that the number of output messages equals the predetermined threshold; and in response to determining that the number of output messages equals the predetermined threshold, transmitting, by the injector microservice, information recorded by the injector microservice.

6. The computer-implemented method of claim 1 wherein the computing platform comprises a second microservice, and further comprising:

receiving, from the second microservice, a first message to be transmitted via the test output communication mechanism, wherein the first message is intended for a destination.

7. The computer-implemented method of claim 6 wherein the first message is the output message, and identifying the output message transmitted via the test output communication mechanism comprises:

receiving, by the injector microservice, the first message.

8. The computer-implemented method of claim 6 further comprising:

determining, by the injector microservice, that the test configuration file does not comprise a mock reply associated with the destination; and transmitting, by the injector microservice, the first message to the destination in response to determining that the injector microservice does not comprise the mock reply associated with the destination.

9. The computer-implemented method of claim 8 further comprising:

determining, by the injector microservice, that the test configuration file comprises the mock reply associated with the destination; and transmitting the mock reply to the second microservice in response to determining that the test configuration file comprises the mock reply associated with the destination.

10. The computer-implemented method of claim 8 further comprising:

receiving, by the injector microservice, a response message, wherein the response message is transmitted by the destination in response to receiving the first message; and transmitting, by the injector microservice to the second microservice, the response message, in response to receiving the response message transmitted by the destination.

11. The computer-implemented method of claim 6 wherein the test output communication mechanism is HTTP, the first message to be transmitted by the test output communication mechanism is a HTTP message, and the test identifier is a flag in a header of a HTTP message.

12. The computer-implemented method of claim 1, wherein the test configuration file further comprises information identifying a criteria for recording messages, the computing platform comprises a second microservice, and further comprising:

receiving, from the second microservice, a request for the information identifying the criteria for recording messages in response to determining that a first message that is to be transmitted by the second microservice and is intended for a destination;

transmitting, by the injector microservice, to the second microservice, a second message comprising the information identifying the criteria for recording messages;

receiving, by the second microservice, the second message;

determining, by the second microservice, that the first message satisfies the criteria for recording messages; and in response to determining that the first message satisfies the criteria, recording, by the second microservice, information associated with the first message.

13. An apparatus for testing a functionality of a microservice-based computing platform, the computing platform comprises a first microservice, and the apparatus comprising:

an injector microservice, the injector microservice configured to:

receive a test configuration file from a test client;

determine from the test configuration file:

a test input message;

a test input communication mechanism; and a test output communication mechanism;

generate a test identifier for identifying that a message is being used for testing purposes;

transmit the test input message to the first microservice using the test input communication mechanism, wherein the test input message comprises the test identifier;

identify an output message transmitted via the test output communication mechanism, wherein the output message comprises the test identifier;

record the output message comprising the test identifier; and report a test output to the test client, wherein the test output comprises the recorded output message.

14. The apparatus of claim 13 wherein the test output communication mechanism is a data stream, the test identifier comprises a correlation identification value, and the injector microservice is further configured to:
- subscribe to the data stream; and
- identify a second data record published to the data stream comprising the correlation identification value, when identifying the output message transmitted via the test output communication mechanism.

15. The apparatus of claim 14 wherein the injector microservice is further configured to: receive a second message from a second microservice, wherein the second message is intended for a destination.

16. The apparatus of claim 15 wherein the injector microservice is further configured to:
- receive a response message, wherein the response message is transmitted by the destination in response to receiving the second message; and
- in response to receiving the response message, transmit the response message to the second microservice.

17. A computer program product comprising:
- a non-transitory computer-readable storage medium including program code instructions for testing a functionality of a microservice-based computing platform, wherein the program code instructions comprise:
- receive a test configuration file from a test client;
- determine from the test configuration file:
  - a test input message;
  - a test input communication mechanism; and
  - a test output communication mechanism;
- generate a test identifier for identifying that a message is being used for testing purposes;
- transmit the test input message to a microservice of the computing platform using the test input communication mechanism, wherein the test input message comprises the test identifier;
- identify an output message transmitted via the test output communication mechanism, wherein the output message comprises the test identifier;
- record the output message comprising the test identifier; and
- report a test output to the test client, wherein the test output comprises the recorded output message.

* * * * *